US005961127A

United States Patent [19]

Onda

[11] Patent Number: 5,961,127

[45] Date of Patent: Oct. 5, 1999

[54] SEALING STRUCTURE FOR CYLINDER AND CYLINDER HEAD IN RECIPROCATING TYPE INTERNAL COMBUSTION ENGINE AND ASSEMBLING METHOD THEREOF

[75] Inventor: Takanori Onda, Saitama, Japan

[73] Assignee: Honda Giken Kogyo Kabushiki Kaisha, Tokyo, Japan

[21] Appl. No.: 08/781,713

[22] Filed: Jan. 10, 1997

[30] Foreign Application Priority Data

Jan. 12, 1996 [JP] Japan .................................... 8-021716
Dec. 6, 1996 [JP] Japan .................................... 8-326526

[51] Int. Cl.$^{6}$ .............................. F16J 15/08; F02F 11/00

[52] U.S. Cl. ............................................................ 277/598

[58] Field of Search ..................................... 277/591, 598

[56] References Cited

U.S. PATENT DOCUMENTS

| | | |
|---|---|---|
| 1,825,769 | 10/1931 | Barbarou . |
| 3,340,774 | 9/1967 | Brenneke . |
| 4,192,520 | 3/1980 | Hasegawa . |
| 5,125,375 | 6/1992 | Vuk . |
| 5,577,472 | 11/1996 | Banta, III et al. . |
| 5,687,475 | 11/1997 | Inciong . |

FOREIGN PATENT DOCUMENTS

| | | |
|---|---|---|
| 874706 | 8/1942 | France . |
| 1252580 | 5/1961 | France . |
| 1601139 | 8/1970 | France . |
| 4415825 | 11/1995 | Germany . |
| 59-60365 U | 4/1984 | Japan . |
| 5-73360 | 3/1992 | Japan . |
| Y2 6-37238 | 9/1994 | Japan . |
| 1166370 | 10/1969 | United Kingdom . |

*Primary Examiner*—Anthony Knight
*Assistant Examiner*—John L. Beres
*Attorney, Agent, or Firm*—Birch, Stewart, Kolasch & Birch, LLP

[57] ABSTRACT

To provide a sealing structure for a cylinder and a cylinder head, which is significantly effective for a reciprocating type internal combustion engine in which a cylinder and a cylinder head are detachably connected with each other through a gasket. An end portion, on the side being in contact with the cylinder head, of the cylinder bore of the cylinder sleeve in the cylinder block has a notched conical surface as a notched inclined surface whose inside diameter gradually enlarges from the inner peripheral-surface of the cylinder bore toward the contact end surface with the cylinder head. An outer peripheral portion, on the cylinder side, of an endless ring-like gasket made of soft steel or stainless steel interposed between the cylinder block and the cylinder head has a taperingly conical surface as a taperingly inclined surface capable of being brought in close contact with the notched conical surface of the cylinder bore.

21 Claims, 14 Drawing Sheets

SEALING STRUCTURE FOR CYLINDER AND CYLINDER HEAD IN RECIPROCATING TYPE INTERNAL COMBUSTION ENGINE AND ASSEMBLING METHOD THEREOF

BACKGROUND OF THE INVENTION

1. Field of the Invention

The present invention relates to a sealing structure for a cylinder and a cylinder head, which is significantly effective for a reciprocating type internal combustion engine in which a cylinder and a cylinder head are detachably connected with each other through a gasket and an assembling method thereof.

2. Description of Background Art

In a reciprocating type internal combustion engine in which a cylinder and a cylinder head are detachably connected to each other, a gasket is interposed between the cylinder and the cylinder head for air-tightly sealing the cylinder and the cylinder head. Examples of gaskets include a semi-metallic gasket in which an outer surface of a plate-like substrate, formed of incombustible fibers such as asbestos, is covered with a thin metal sheet, and a metal gasket in which one or plural beads are concentrically formed along an opening, corresponding to a cylinder bore, formed in a thin metal sheet. See Japanese Utility Model Laid-Open No. Hei 5-73360.

A further proposal has been made for a reciprocating type internal combustion engine in which an annular groove having a larger diameter than a cylinder bore is concentrically formed in an end surface of a cylinder, and a metal-made endless ring whose cross-section is circular is fitted in the annular groove. See Japanese Utility Model Laid-Open No. Sho 59-60365.

The metallic gasket which requires plural types of raw materials is complicated in its structure. Therefore, the productivity of manufacturing is low and the cost is high. Further, since the substrate is not a thermally good conductor, heat of the cylinder head is hard to be transmitted to the cylinder so that the side wall surface of the cylinder head of the combustion chamber rises in temperature.

The metal gasket made of a thin metal sheet described in Japanese Utility Model Laid-Open No. Hei 573360 requires a plurality of sheets, as shown in Japanese Utility Model Publication No. Hei 6-37238, in order to secure a sealability, making it difficult to reduce the cost. In order to increase the fastening force of fastening bolts for fastening the cylinder and the cylinder head to each other in an attempt to adapt to the high output ratio of the internal combustion engine, there was a limitation in flatness of a gasket surface and accuracy in dimension of parts due to an increase in fastening strain.

The semi-metallic gasket as well as the thin metal made metal gasket require rigidity for the mating surface between the cylinder and the cylinder head. As a result of this, the wall-thickness of each of the cylinder and the cylinder head increases, making it difficult to reduce the weight of the internal combustion engine.

In the gasket described in Japanese Utility Model Laid-Open No. Sho 59-60365, the deformation of the endless ring caused by the diametrical compressive force applied to the peripheral surface of the metal-made endless ring is relatively large in the initial state but as the deformation progresses, the deformation increasing amount rapidly lowers. Therefore, an unevenness of a diameter of the endless ring, an error in depth of the annular groove, and a deviation of a planeness of the contact surface between the cylinder and the cylinder head cannot be absorbed sufficiently by the deformation of the endless ring. The contact surface between the cylinder and the cylinder head cannot be sealed positively unless the processing accuracy of the contact surface between the cylinder and the cylinder head is maintained at a high level.

SUMMARY AND OBJECTS OF THE INVENTION

The present invention relates to an improvement in a reciprocating type internal combustion engine which overcomes such difficulties as noted above. More specifically, the present invention provides a sealing structure for a cylinder and a cylinder head in a reciprocating type internal combustion engine in which the cylinder and the cylinder head are sealed by drawing the cylinder and the cylinder head closer to each other by means of fastening and fixing means in a state in which a gasket is interposed between the cylinder and the cylinder head. The gasket is formed in a ring-like shape and is clamped by the fastening and fixing means through the cylinder and the cylinder head has an outer peripheral surface formed into a taperingly inclined surface so that the ring-like gasket receives a compressive force along a circumferential direction of the ring-like gasket. In addition, either the cylinder or the cylinder head has an inclined surface capable of being brought in close contact with the taperingly inclined surface of the ring-like gasket.

The present invention is configurated as described above. Therefore, when a force is applied to both the cylinder and the cylinder head by the fastening and fixing means so that they are drawn closer to each other, the ring-like gasket interposed between the cylinder and the cylinder head is pressed into a deep portion of the inclined surface of the cylinder or the cylinder head by the relative sliding movement between the taperingly inclined outer peripheral surface of the gasket and the inclined surface of the cylinder or the cylinder head so that a great normal force caused by a wedge force is generated in the taperingly inclined surface of the ring-like gasket and the inclined surface of the cylinder or the cylinder head. Both the inclined surfaces are strongly pressed to each other by the normal force to increase the sealability between both of the inclined surfaces. Even if the contact surface of the cylinder or the cylinder head in contact with the ring-like gasket is deviated from an accurate plane, for example, is formed to be wavy, the ring-like gasket is properly curved corresponding to irregularity of the contact surface of the cylinder or the cylinder head. The contact surface between the ring-like gasket and the cylinder or the cylinder head comes into close contact over the entire periphery of the ring-like gasket, to thereby increase the sealability at that portion. Accordingly, it is possible to positively prevent high pressure combustion gases generated during the operation of the internal combustion engine from leaking out between the cylinder and the cylinder head.

Further, according to the present invention, the contact surface between the cylinder and the cylinder head exposed to high temperature and high pressure combustion gases is sealed with the ring-like gasket. Therefore, the gasket for sealing a cooling water passage within the cylinder and the cylinder head can be constituted separately from the ring-like gasket for sealing the high temperature and high pressure combustion gases. As a result, the gasket for sealing cooling water can be formed of a soft material which is low in heat resistance but rich in elasticity to maintain a high water tightness.

Furthermore, according to the present invention, since the gasket for sealing the combustion chamber defined by the cylinder and the cylinder head is in the form of a small-diameter ring, the contact surface between the cylinder and the cylinder head need not be enlarged, thus promoting miniaturization and reduction in weight of the internal combustion engine.

Moreover, in the case where the ring-like gasket is endless, upon operation of the engine at which high pressure combustion gases are generated, the endless ring-like gasket receives the concentrated heat of the high temperature combustion gases and tends to greatly thermally expand as compared with the cylinder or the cylinder head formed with the inclined surface to generate a great pressing force in the taperingly inclined surface of the endless ring-like gasket and the inclined surface of the cylinder or the cylinder head, thus further enhancing the sealability.

Even if the contact portion between the cylinder and the cylinder head is relatively deviated in position, the plane end surface of the cylinder head or the plane end surface of the cylinder can always come into close contact with the plane end surface of the ring-like gasket so that a high sealability can be maintained.

The width of the sealing portion surrounding an opening portion of each cylinder hole is narrowed, to reduce intervals between respective cylinder holes. This feature promotes miniaturization and reduction in weight of the internal combustion engine.

With regard to a water-cooled reciprocating type internal combustion engine, a gasket for sealing the inner and outer edges of an opening portion of a water jacket surrounding each cylinder hole can be provided separately from a gasket for sealing the opening portion of each cylinder hole. Thus, the gasket for sealing the water jacket can be made from an elastically soft material, and thereby the sealability of a cooling system can be also ensured.

The soft metal thin film layer on the surface of the ring-like gasket can be easily deformed in accordance with irregularities on the surface of the cylinder hole and on the lower surface of the cylinder head. The friction of the contact portion between the surface of the cylinder hole or the lower surface of the cylinder head and the surface of the ring-like gasket can be reduced, to thereby improve the sealability of the contact portion between the cylinder and the cylinder head.

The friction of the contact surface between the surface of the ring-like gasket and the surface of the cylinder hole or the lower surface of the cylinder head can be significantly reduced, to thereby further improve the sealability of the contact portion between the cylinder and the cylinder head.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
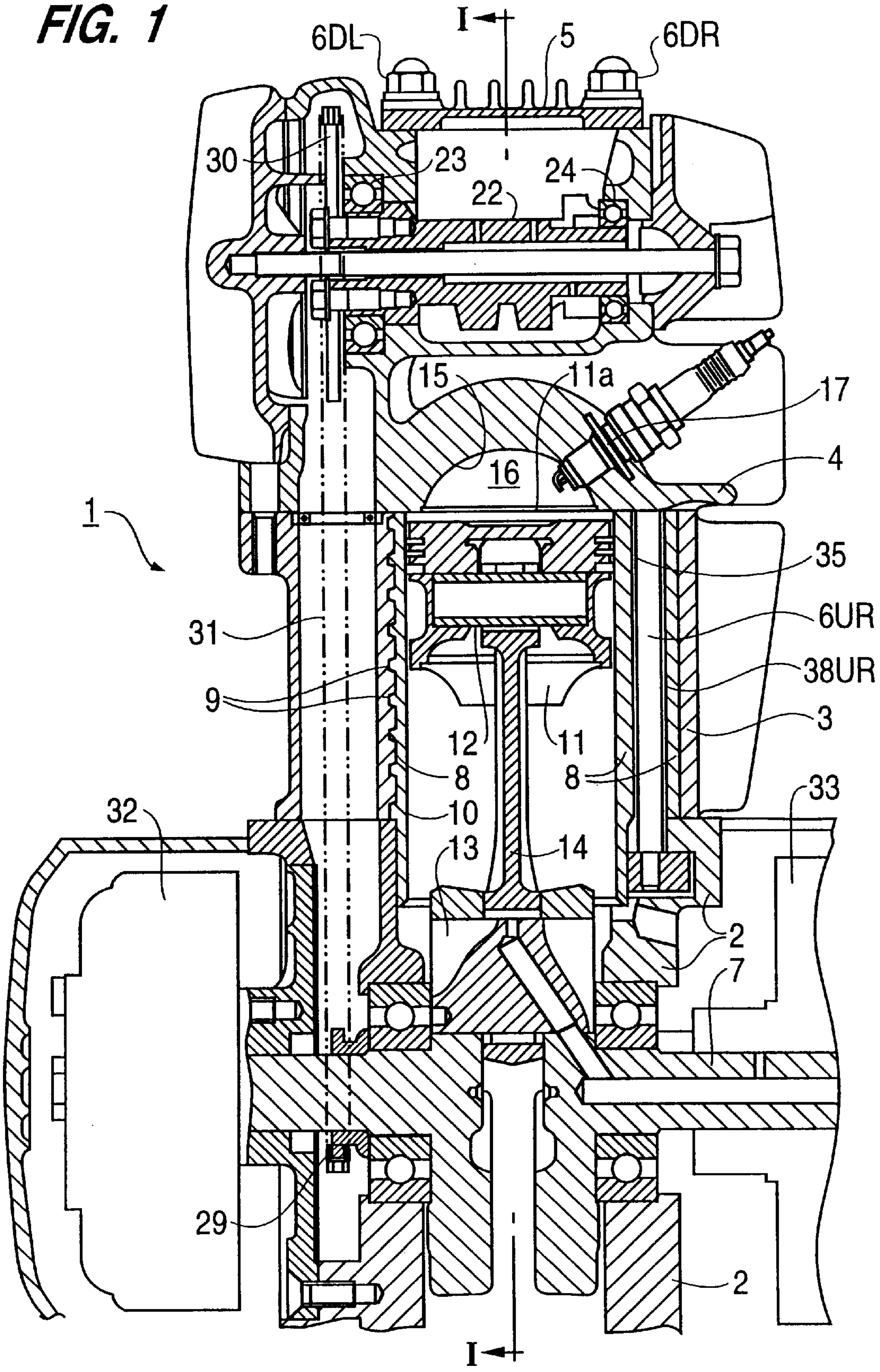
FIG. 1 is a vertical sectional view of a reciprocating type internal combustion engine showing one embodiment of a sealing construction between a cylinder and a cylinder head according to the present invention.

Hereinafter, one embodiment of the present invention will be described with reference to FIGS. 1 to 9.

An air-cooled overhead valve type single cylinder four-cycle internal combustion engine 1 is mounted on a motorcycle (not shown) so that a crank shaft 7 is directed at the vehicle width on a crank case 2 made of aluminum or an aluminum alloy. A cylinder block 3, a cylinder head 4 and a cylinder head cover 5 made of a material similar to the former are secured thereto. The crank case 2, the cylinder block 3, the cylinder head 4 and the cylinder head cover 5 are connected mutually integrally by means of four stud bolts 6 which extend therethrough from the top towards the bottom. Additionally, in FIG. 1, the stud bolt 6, adjacent to the cylinder head cover 5, is not positioned on the extension line of the stud bolt 6 extending through the cylinder block 3 because the right cross-section of the cylinder block 3 is cut at a place different from the cross-section passing through the crank shaft 7 and a cam shaft 22.

The crank shaft 7 is pivotably supported on the crank case 2. A cylinder sleeve 8, made of cast iron which is high in abrasion resistance and mechanical strength, is integrally cast forwardly of the vehicle during casting of the cylinder block 3. Peripheral projections 9 are disposed at fixed intervals along the center axis of the cylinder sleeve 8 on the outer periphery of the cylinder sleeve 8 in order to increase an adhesive force in the direction of the center axis of the cylinder sleeve 8. A vertically slidable piston 11 is inserted into a cylinder hole 10 of the cylinder sleeve 8. The opposite ends of a connecting rod 14 are rotatably mounted on a piston pin 12 of the piston 11 and a crank pin 13 of the crank shaft 7, respectively. A combustion chamber 16 is defined by a substantially hemispherical recess surface 15 in the central portion of the lower surface of the cylinder head 4, the cylinder bore 10 of the cylinder block 3, and a top surface 11*a* of the piston 11. The piston 11 is pressed downwardly in the combustion chamber 16 by combustion gases intermittently produced and ignited by an ignition plug 17 in the vicinity of the top dead center of the piston 11. The crank shaft 7 is rotated by the pressing force.

Figure 2:
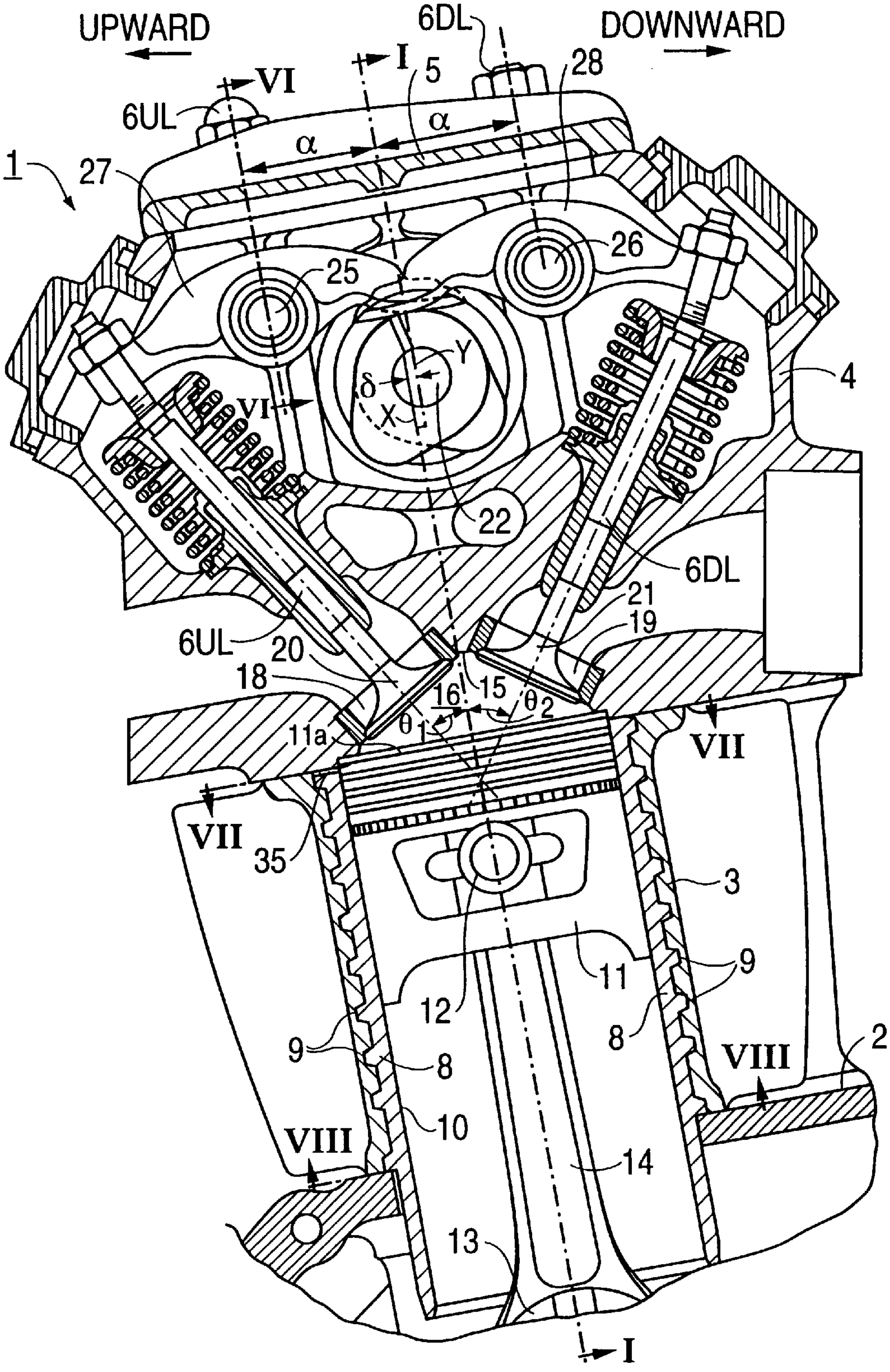
FIG. 2 is a sectional front view taken along line II—II of FIG. 1.

As illustrated in FIG. 2, on the upper and lower sides, left and right sides, of the cylinder 4 are formed a large diameter intake port 18 and an exhaust port 19 smaller in diameter than the former along the plane perpendicular to the crank shaft 7. A large diameter intake valve 20 and a small diameter exhaust valve 21 are closeably provided in the openings of the intake port 18 and the exhaust port 19 on the combustion chamber side, respectively.

When the intake valve 20 and the exhaust valve 21 are arranged so that both ends of enlarged head portions of the large diameter intake valve 20 and the small diameter exhaust valve 21 are positioned on substantially semicircular arcs formed by cutting the substantially hemispherical recess surface 15 at a plane passing through the intake port 18 and the exhaust port 19, an intersection formed by a center line of the intake valve 20 and a center line of the exhaust valve 21, as shown in FIG. 2, is positioned on the center line of the cylinder bore 10, and the following relationship is established between an angle $\theta_1$ formed between the center line of the intake valve 20 and an angle $\theta_2$ formed between the center line of the exhaust valve 21 and the center line of the cylinder bore 10, $$\theta_1 > \theta_2$$

since the diameter of the enlarged head portion of the intake valve 20 is large as compared with the diameter of the enlarged head portion of the exhaust valve 21.

As a result, the top end of the intake valve 20 is positioned at a place close to the center line of the cylinder bore 10, and the top end of the exhaust valve 21 is positioned at a place away from the center line of the cylinder bore 10. The cam shaft 22 is offset closer to the exhaust valve 21 by δ from the place at the equal distance from the top ends of the intake valve 20 and the exhaust valve 21, that is, from the center line of the cylinder bore 10, and is rotatably mounted on the cylinder head 4 through-bearings 23 and 24 as shown in FIG. 2.

Further, as shown in FIG. 2, rocker arm shafts 25 and 26 extend through and are supported on the cylinder head 4 while being directed at the vehicle width at places away at equal distance up and down, as illustrated in FIG. 2 towards the left and right, with respect to the cam shaft 22, and rocker arms 27 and 28 and are rockably supported on the rocker arm shafts 25 and 26. As shown in FIG. 1, a drive sprocket 29 is integrally mounted on the crank shaft 7, and a driven sprocket 30 having the number of teeth twice of that of the drive sprocket 29 is mounted on the cam shaft 22. A cam chain 31 extends over the drive sprocket 29 and the driven sprocket 30 so that every time the crank shaft 7 is rotated twice, the intake valve 20 and the exhaust valve 21 are driven to be opened and closed once at a fixed timing.

Moreover, as shown in FIG. 1, a generator 32 and a clutch 33 are disposed on the left side and the right side, respectively, of the crank shaft 7, the clutch 33 is connected to a rear wheel through a clutch and a speed change gear (not shown).

Figure 3:
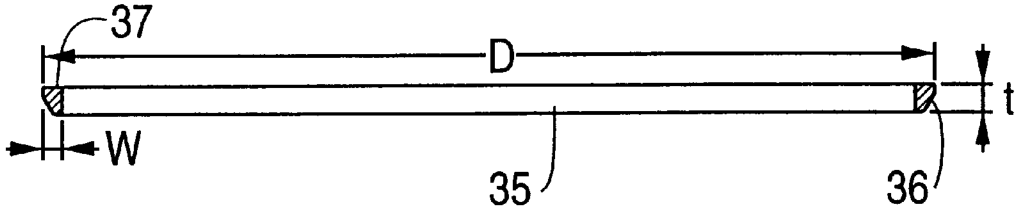
FIG. 3 is a sectional front view of an endless ring-like gasket according to the embodiment shown in FIG. 1.
Figure 4:
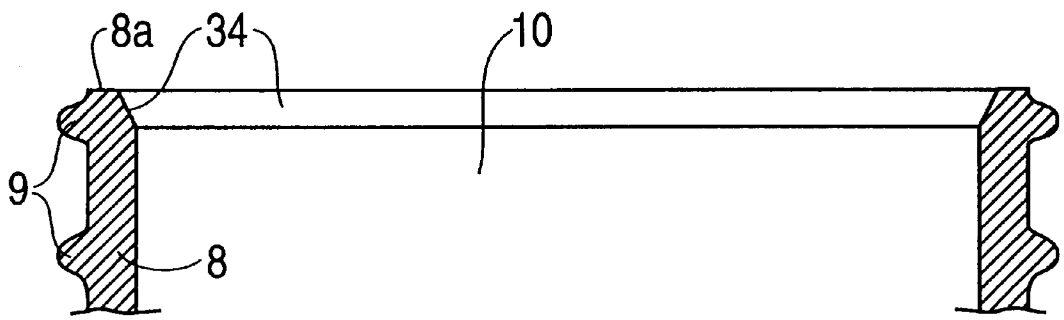
FIG. 4 is a vertical sectional front view of a contact end portion of a cylinder sleeve according to the embodiment shown in FIG. 1.
Figure 5:
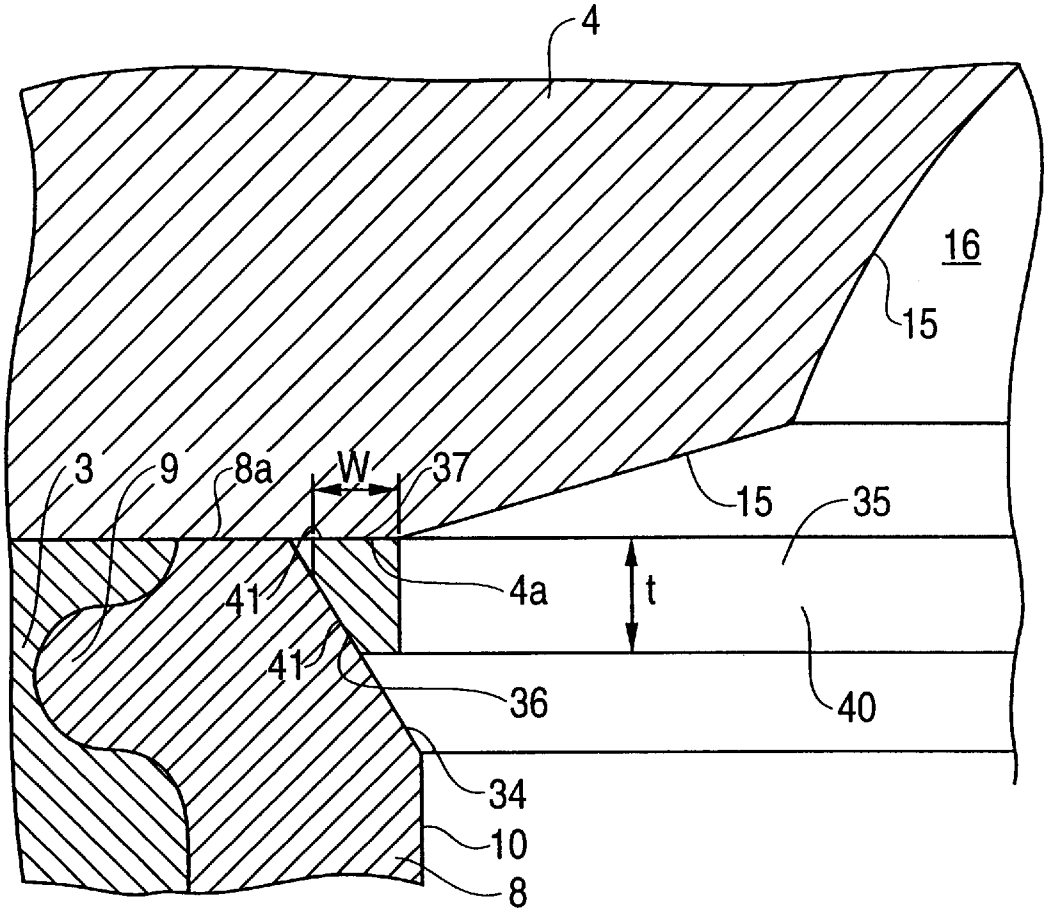
FIG. 5 is an enlarged vertical sectional view of an essential portion shown in FIG. 1.

As shown in FIG. 3 or 5, an end portion, on the side being in contact with the cylinder head, of the cylinder bore 10 of the cylinder sleeve 8 in the cylinder block 3 has a notched conical surface 34 as a notched inclined surface whose inside diameter gradually enlarges from the inner peripheral surface of the cylinder bore 10 toward the contact end surface 8a with the cylinder head 4. On the other hand, an outer peripheral portion, on the cylinder side, of an endless ring-like gasket 35 is made of soft steel or stainless steel interposed between the cylinder block 3 and the cylinder head 4 with a taperingly conical surface 36 as a taperingly inclined surface capable of being brought in close contact with the notched conical surface 34 of the cylinder bore 10. The endless ring-like gasket 35 is so configurated that the width w thereof is about 2.23% with respect to the outside diameter D of the endless ring-like gasket 35, and the thickness t thereof is about 3.13% with respect to the outside diameter D of the endless ring-like gasket 35.

The notched conical surface 34 and the endless ring-like gasket 35 are formed to have the following dimensional relation: namely, in the state where the endless ring-like gasket 35 is fitted in the cylinder sleeve 8 in such a manner that the taperingly conical surface 36 of the endless ring-like gasket 35 comes into light contact with the notched conical surface 34 of the cylinder sleeve 8, an upper plane 37 of the endless ring-like gasket 35 slightly projects from the contact end surface 8*a* of the cylinder sleeve 8. In the state where the bolts 6 are firmly fastened, the endless ring-like gasket 35 is pressed into the notched conical surface 34 of the cylinder sleeve 8 until the taperingly conical surface 36 of the endless ring-like gasket 35 is slidably moved along the notched conical surface 34 of the cylinder sleeve 8, and the upper end plane 37 of the endless ring-like gasket 35 assumes substantially the same height as the contact end surface 8*a* of the cylinder sleeve 8 by a circumferential compressive force of the endless ring-like gasket 35.

Axial inflated portions 39 for encircling bolt insert holes 38 through which the stud bolts 6 are inserted are projected at four points 4 before and behind, and left and right in the outer periphery of the cylinder sleeve 8.

Figure 6:
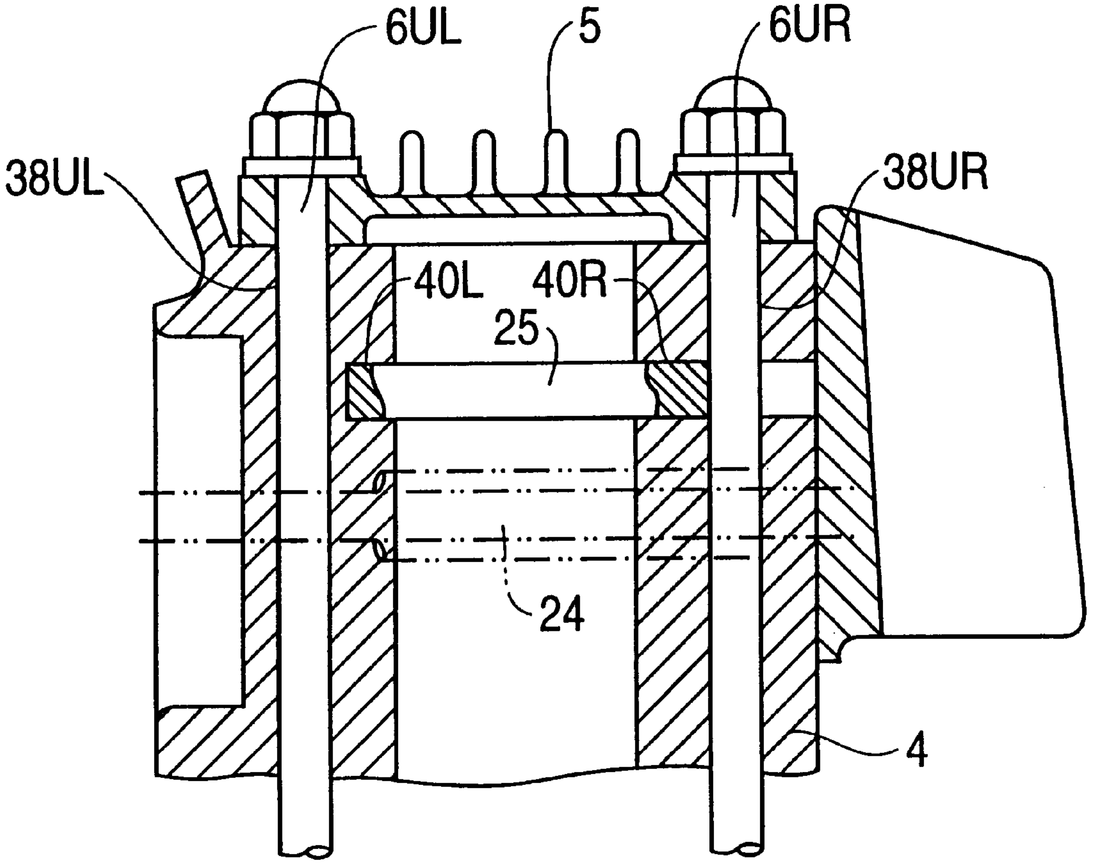
FIG. 6 is a vertical sectional side view taken along line VI—VI of FIGS. 2 and 7.

As shown in FIG. 2, pivotably supporting holes are provided for pivotably supporting the rocker arm shafts 25 and 26. The holes are formed in the cylinder head 4 in such a manner that the rocker arm shaft 25 on the intake valve 20 side and the rocker arm shaft 26 on the exhaust valve 21 side are arranged at equal intervals 6 with respect to a center line Y passing through the center of the cam shaft 22 in parallel to the center line Y of the cylinder hole 10. As shown in FIG. 6, out of the pivotably supporting holes, the holes $\mathbf{40}_L$ and $\mathbf{41}_L$ (only $\mathbf{40}_L$ is shown, and $\mathbf{41}_L$ is not shown) on the driven sprocket 30 side, that is, on the left side of the vehicle are blind holes, and the holes $\mathbf{40}_R$ and $\mathbf{41}_R$ (only $\mathbf{40}_R$ is shown, and $\mathbf{41}_R$ is not shown) on the side opposite to the driven sprocket 30, that is, on the right side of the vehicle are opened rightward in such a manner as to be perpendicular to the upper right bolt insert holes $\mathbf{38}_{UR}$ and $\mathbf{38}_{UR}$ ($\mathbf{38}_{UR}$ is not shown).

Figure 7:
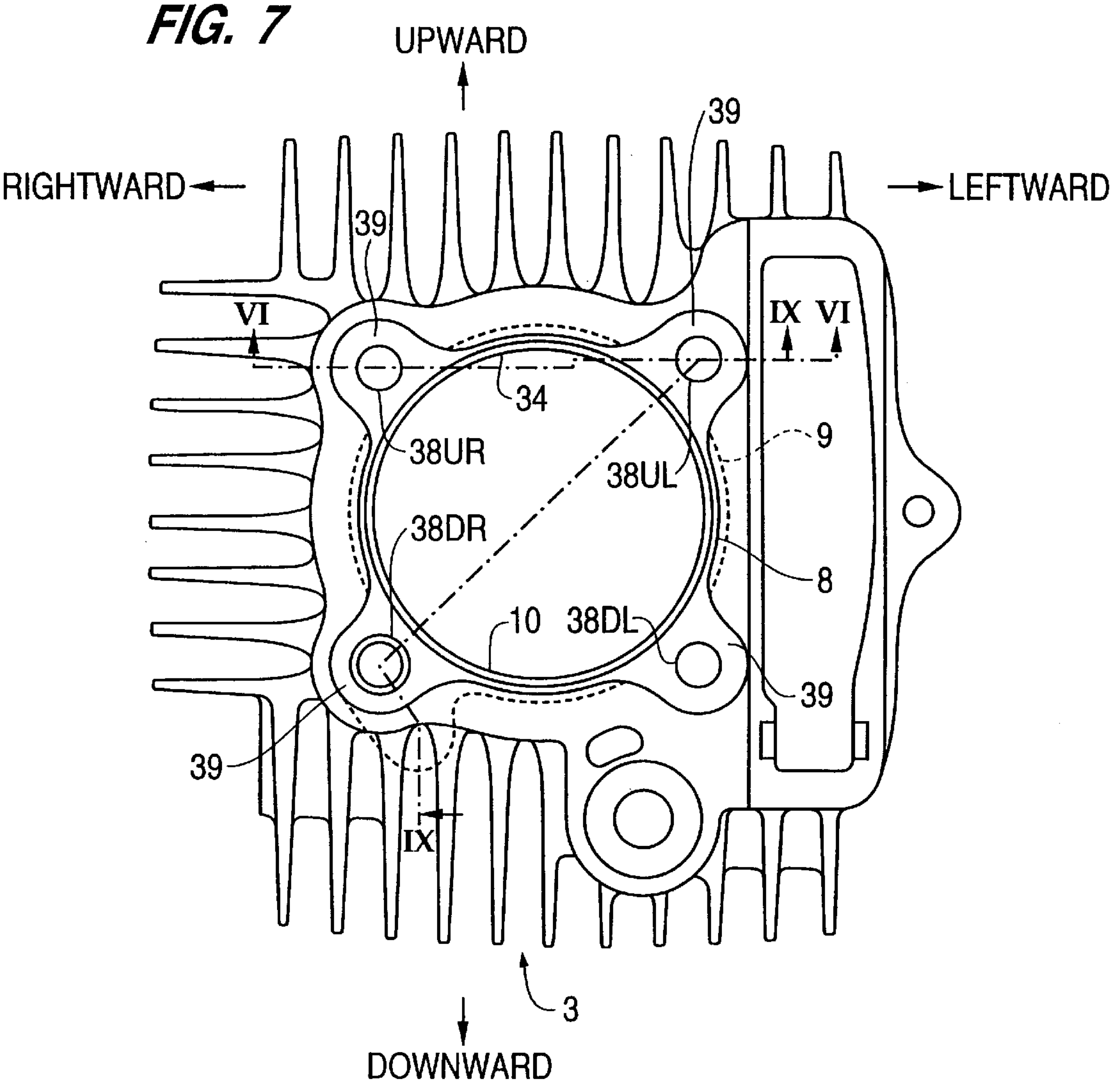
FIG. 7 is a view taken on line VII—VII of FIG. 2.
Figure 8:
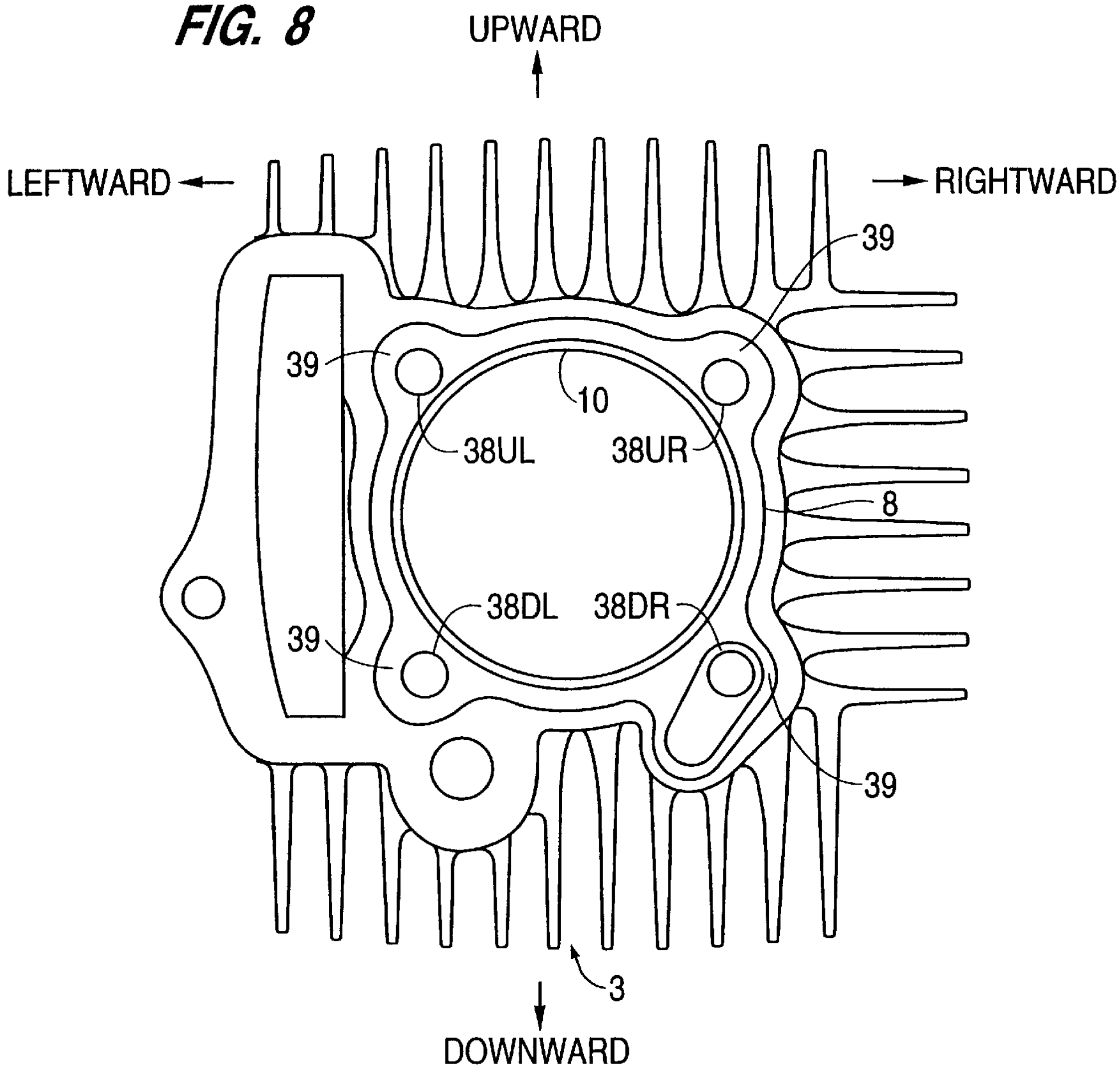
FIG. 8 is a view taken on line VIII—VIII of FIG. 2.
Figure 9:
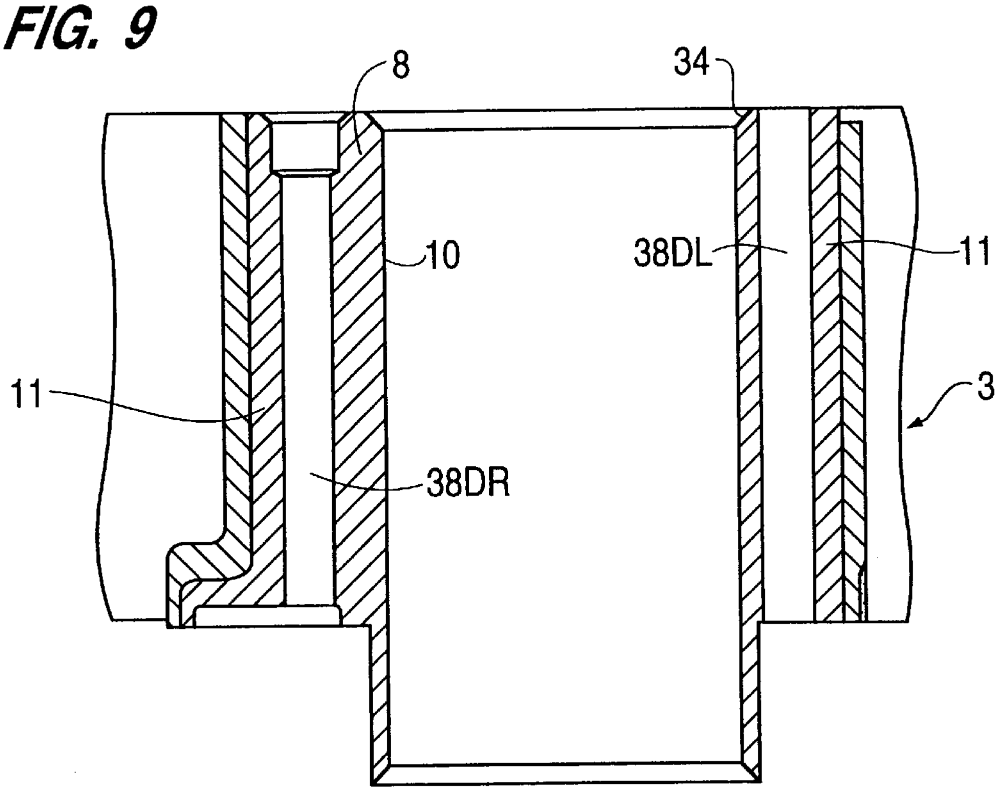
FIG. 9 is a vertical sectional side view taken along line IX—IX of FIG. 7.

As shown in FIG. 7, the left bolt insert holes $\mathbf{38}_{UL}$ and $\mathbf{38}_{DL}$ (since FIG. 7 is a front view, left is reversed to right) are arranged on the same vertical plane, and the right bolt insert holes $\mathbf{38}_{UR}$ and $\mathbf{38}_{DR}$ are also arranged on the same vertical plane and the lower bolt insert holes $\mathbf{38}_{DL}$ and $\mathbf{38}_{DR}$ are also arranged on the same plane. With respect to the upper bolt insert holes $\mathbf{38}_{UL}$ and $\mathbf{38}_{UR}$, the upper left bolt insert hole $\mathbf{38}_{UL}$ is arranged slightly above the upper right bolt insert hole $\mathbf{38}_{UR}$.

Of the four bolt insert holes 38, right upper and right lower bolt insert holes $\mathbf{38}_{UR}$ and $\mathbf{38}_{DR}$ allow a lubricant to pass therethrough and the left upper bolt insert hole $\mathbf{38}_{UL}$ is communicated to the breather passage, and accordingly, air/liquid-tight type box nuts each having a round top are screwed with the tops of three bolts $\mathbf{6}_{UR}$, $\mathbf{6}_{DR}$ and $\mathbf{6}_{UL}$ inserted in the three bolt insert holes $\mathbf{38}_{UR}$, $\mathbf{38}_{DR}$ and $\mathbf{38}_{UL}$ and a normal nut is screwed with the top of the remaining bolt $\mathbf{6}_{DL}$. A sealing rubber packing is provided in each of the air/liquid-tight type bolt insert holes $\mathbf{38}_{UL}$, $\mathbf{38}_{UR}$ and $\mathbf{38}_{DR}$ at the mating surface between the cylinder block 3 and the cylinder head 4, and the opening edge of the cam chain chamber.

Figure 10:
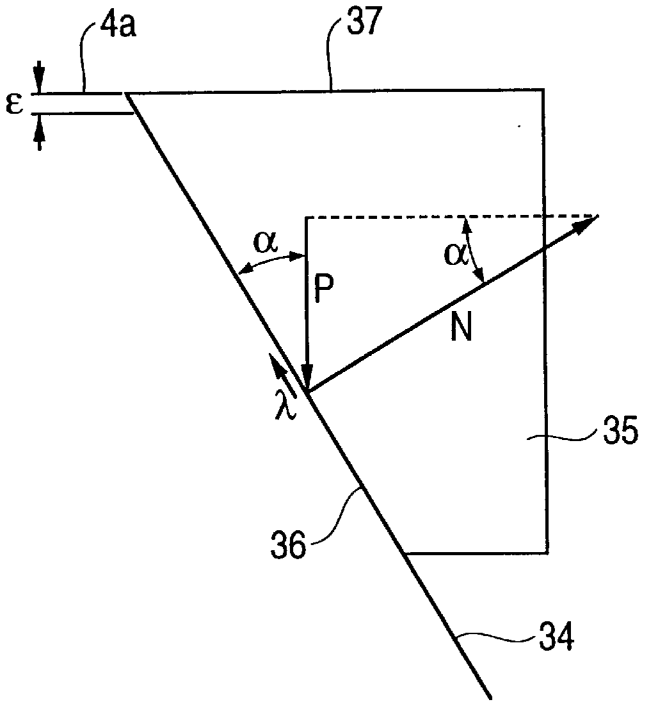
FIG. 10 is a view illustrating a force exerting on a notched conical surface of a cylinder sleeve and a taperingly conical surface of an endless ring-like gasket.

The embodiment shown in FIGS. 1 to 9 is configurated as described above. Therefore, when the bolts 6 are firmly fastened, the cylinder block 3 and the cylinder head 4 are strongly drawn closer to each other, and the taperingly conical surface 36 of the endless ring-like gasket 35 interposed between the cylinder block 3 and the cylinder head 4 is slidably moved along the notched conical surface 34 of the cylinder sleeve 8. If the frictional force between the taperingly conical surface 36 and the notched conical surface 34 is disregarded, a normal force N generated in the notched conical surface 34 and the taperingly conical surface 36 with respect to an axial fastening force P of the stud bolt 6 is, as shown in FIG. 10, represented by $$N=P/\sin\alpha \ldots 1 \qquad \text{[Equation 1]}$$

wherein α is an angle of inclination of the notched conical surface 34 with respect to the center line of the cylinder bore 10. If a frictional force R between the tapering conical surface 36 and the notched conical surface 34 is taken into consideration, the normal force N is represented by $$N=P/(\sin\alpha+\tan\lambda\times\cos\alpha) \ldots 2 \qquad \text{[Equation 2]}$$

wherein λ represents a fictional angle, and tan λ represents a frictional coefficient. In any case, the normal force N of the notched conical surface 34 is a large value as compared with the axial fastening force P of the stud bolt 6, and accordingly, the taperingly conical surface 36 is strongly pressed against the notched conical surface 34 to increase the sealability between the notched conical surface 34 and the taperingly conical surface 36.

Even if the contact surface 4*a* of the cylinder head 4 is deviated from the accurate plane and formed irregularly, the endless ring-like gasket 35 being thin and deformable can accommodate to the irregularities of the contact surface 4*a*. Moreover, the notched conical surface 34 and the endless ring-like gasket 35 are formed in such a manner that even if the contact surface 4*a* of the cylinder head 4 is deviated from the accurate plane and formed irregularly, and in the state where no press-in force is exerted on the endless ring-like gasket 35 fitted in the notched conical surface 34 of the cylinder sleeve 8, the upper end plane 37 of the endless ring-like gasket 35 projects above by E from the contact end 8*a* of the cylinder sleeve 8. Therefore, the endless ring-like gasket 35 is adequately curved corresponding to irregularities of the contact surface 4*a* of the cylinder head 4, and the upper end plane 37 of the endless ring-like gasket 35 and the contact surface 4*a* of the cylinder head 4 closely come into contact with each other over the whole periphery of the endless ring-like gasket 35 to increase the sealability between the upper end plane 37 and the contact surface 4*a*.

As described above, the endless ring-like gasket 35 closely comes into contact with the notched conical surface 34 of the cylinder sleeve 8 and the contact surface 4*a* of the cylinder head 4 to increase the sealability of both the contact portions. Therefore, it is possible to positively prevent high pressure combustion gases generated in the combustion chamber 16 during the operation of the single cylinder 4-cycle internal combustion engine 1 from being leaked from and between the sleeve contact end 8*a* of the cylinder block 3 and the contact surface 4*a* of the cylinder head 4.

Further, upon operation of the engine at which the high pressure combustion gases are generated, the endless ring-like gasket 35 is exposed to the high temperature combustion gases to receive heat concentratedly. As a result, a large thermal expansion force is generated as compared with the cylinder head 4 and the cylinder sleeve 8, and the pressing force generated in the notched conical surface 34 of the cylinder sleeve 8 and the taperingly conical surface 36 of the endless ring-like gasket 35 significantly increases to further enhance the sealability.

The endless ring-like gasket 35 is applied with a reaction to: be greater thermally expanded from the cylinder block 3 and the cylinder head 4, and always receives a compressive force in the peripheral direction, as a result of which it is less susceptible to rupture caused by tension.

In particular, since the single cylinder 4-cycle internal combustion engine 1 is air-cooled as in the present embodiment, only the endless ring-like gasket 35 will suffice as the sealing member, to thereby significantly simplify the structure and to considerably reduce the cost.

Moreover, since the gasket for sealing the combustion chamber 16 is the small-diameter endless ring-like gasket 35, the contact surface between the cylinder block 3 and the cylinder head 4 need not be widened, and the single cylinder 4-cycle internal combustion engine 1 can be miniaturized and reduced in weight.

In the embodiment shown in FIGS. 1 to 9, since the peripheral portion of the bolt insert hole 38 is integrated within the thick inflated portion 39 of the cylinder block 3, it is possible to make the diameter of the cylinder block 3 larger and increase the inside diameter of the cylinder bore 10 and hence to easily promote the output increase of the single cylinder 4-cycle internal combustion engine 1, while avoiding the lowering of the connecting strength between the cylinder sleeve 8 and the ground layer of the cylinder block 3 and mutual interference.

As described above, in the single cylinder 4-cycle internal combustion engine 1, the shape and dimension of the cylinder block 3 and the interval between the bolt insert holes 36 need not be changed. Therefore, it is not necessary to change molds and parts heretofore used for production and is possible to significantly suppress the cost-up resulting from the change in design of the single cylinder 4-cycle internal combustion engine 1.

Further, the inside diameter of the cylinder bore 10 is increased without changing the shape and dimension of the cylinder block 3 whereby a cross-sectional area of the cylinder block 3 is reduced, and even if an average fastening compressive stress of the cylinder block 3 caused by the fastening force of the stud bolt 6 increases, the cylinder block 3 easily can receive the fastening force because the cylinder sleeve 8 of high mechanical strength is integrated with the axial inflated portion 11 in the periphery of the bolt insert hole 38 encircling the stud bolt 6.

Further, the axial inflated portion 39 in the peripheral portion of the bolt insert hole 38 is integral with the cylinder sleeve 8 and has the mechanical strength and the thermal expansion coefficient substantially equal to those of the stud bolt 6. Therefore, even if the cylinder block 3 and the stud bolts 6 are heated during the operation of the single cylinder 4-cycle internal combustion engine 1, there occurs no great difference in thermal expansion between the cylinder sleeve 8 and the stud bolt 6, and the stress exerted on the cylinder sleeve 8 and the stud bolts 6 is not so large.

As shown in FIG. 2, the rocker arm shaft 25 on the intake valve side 20 and the rocker arm shaft 26 on the exhaust valve side 21 are arranged at the equal intervals 5 with respect to the line parallel to the bolt insert hole 38 passing through the cam shaft 22. Therefore, the rocker arm 27 on the intake valve 20 side and the rocker arm 28 on the exhaust valve side 21 may be of the same shape and the same dimension, and the fitting angle of the intake valve 20 and the exhaust valve 21, and the intake port 18 and the exhaust port 19 need not be changed. As a result, the number of parts can be reduced, and the cost can be reduced.

As shown in FIG. 2, the cam shaft 22 is positioned substantially in the center of the interval between the stud bolts $\mathbf{6}_{UL}$, $\mathbf{6}_{UR}$ and the stud bolts $\mathbf{6}_{DL}$, $\mathbf{6}_{DR}$ inserted into the bolt insert holes $\mathbf{38}_{UL}$, $\mathbf{38}_{UR}$ and the bolt insert holes $\mathbf{38}_{DL}$, $\mathbf{38}_{DR}$, and the rocker arm shaft 25 and the rocker arm shaft 26 are positioned so as to intersect the stud bolts $\mathbf{6}_{UL}$, $\mathbf{6}_{UR}$ and the stud bolts $\mathbf{6}_{DL}$, $\mathbf{6}_{DR}$. Therefore, the cam reaction exerting on the cam shaft 22 and the rocker arm shafts 25, 26 can be borne substantially equally by the stud bolts $\mathbf{6}_{UL}$, $\mathbf{6}_{UR}$, $\mathbf{6}_{DL}$, and $\mathbf{6}_{DR}$, and the cylinder block 3, the cylinder head 4 and the cylinder head cover 5 can be firmly stably connected to each other.

Although the endless ring-like gasket is used in the embodiments shown in FIGS. 1 to 9, it may be replaced with a ring-like gasket with end faces perpendicular to the circumferential direction of the ring.

The ring-like gasket with end faces is obtained by forming a wire having a specified length into a shape having a specified cross-section and bending it in a ring-shape. Accordingly, ring-like gaskets of this type corresponding to various diameters of the cylinder holes 10 can be easily manufactured on a large scale at a low cost.

A gasket with end faces, if it has substantially the same peripheral length as that of an endless ring-like gasket, can exhibit a function similar to that of the endless ring-like gasket when the end faces thereof are closed by a circumferential compressive force applied upon assembly of the gasket. A gap between the end faces of the gasket is desirable to be set at a slight amount in a state before assembly in terms of workability in assembly.

Moreover, although the cylinder sleeve 8 is made from cast iron and the endless ring-like gasket 35 is made from soft steel or stainless steel in the previous embodiments, the surface of the endless ring-like gasket 35 may be applied with a thin film of a metal 40 such as copper by plating. In this endless ring-like gasket applied with copper plating, the copper plating layer is easily deformed in accordance with irregularities of a mating member and it has a low friction coefficient, and consequently, as shown by curves (1), (2), (4) and (5) of FIG. 11, the leak amount of a combustion gas in the combustion chamber 16 is significantly reduced. Even when the endless ring-like gasket applied with copper plating is re-used, as shown by a curve (3), the leak amount of a combustion gas is not increased so much. Namely, the endless ring-like gasket applied with copper plating can be repeatedly used, resulting in a reduction in cost.

For the endless ring-like gasket 35 having the upper end surface 37 slightly curved upwardly and applied with copper plating, which is shown by a curve (3), the gas leak amount is larger than that of the endless ring-like gasket having the flat surface shown in the previous embodiments (FIGS. 1 to 9) and applied with copper plating; however, the gas leak mount is smaller than that of the endless ring-like gasket applied with no copper plating, which is shown by the curve (2).

Figure 11:
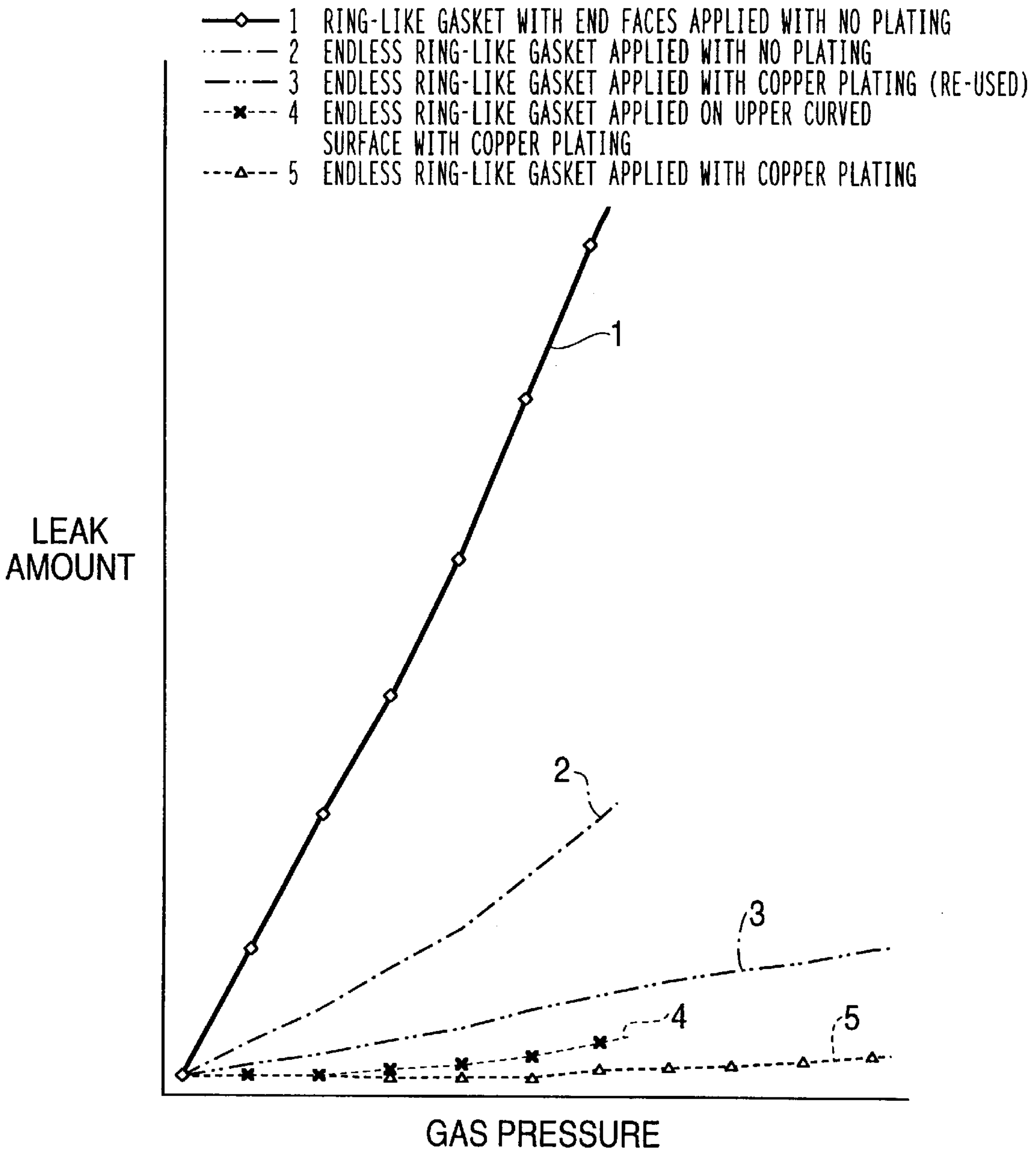
FIG. 11 is a characteristic diagram showing changes in leak amount with an increasing combustion gas pressure for ring-like gaskets having the surfaces applied with no plating and ring-like gaskets having the surfaces applied with copper plating.

For the ring-like gasket with end faces, the gas leak amount is large because of the presence of the end faces, as shown by the curve (1) of FIG. 11. However, if it is applied with copper plating, the gas leak amount is significantly reduced because the taperingly conical surface of the gasket with end faces is slid on and brought in close contact with the upper end notched conical surface 34 of the cylinder hole 10.

In addition, although copper plating is used as the metal thin film in this embodiment, a soft metal such as tin, silver or zinc may be used. Moreover, a similar effect can be obtained by improving the surface roughness in place of formation of a metal thin film in terms of sliding performance.

When the endless ring-like gasket 35 is mounted on the notched conical surface 34 of the cylinder sleeve 8, the taperingly conical surface 36 of the endless ring-like gasket 35 and the notched conical surface 34 may be coated with a lubricant such as a lubricating oil 41. In this case, as seen from Equations 1 and 2, the normal force N between the notched conical surface 34 and the taperingly conical surface 36 is increased, to further enhance the sealability.

Figure 12:
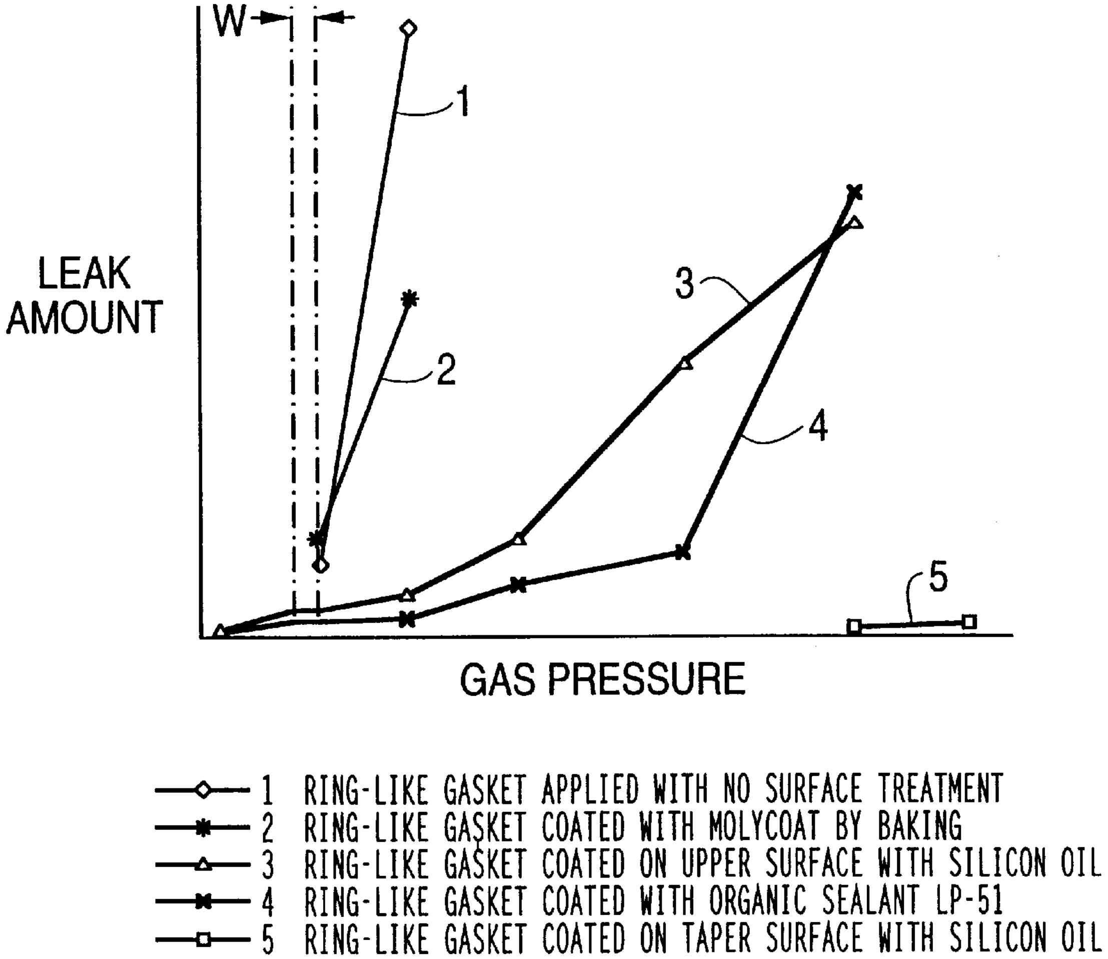
FIG. 12 is a characteristic diagram showing changes in leak amount with an increasing combustion gas pressure for a ring-like gasket having the surface applied with copper plating and coated with no lubricant and ring-like gaskets having the surfaces applied with copper plating and coated with lubricants.

Concretely, when the surface of the endless ring-like gasket applied with copper plating is coated with a lubricant, the leak amount of a combustion gas is significantly reduced as shown in FIG. 12.

FIG. 12 shows the effects of coating of lubricants on the surfaces of endless ring-like gaskets applied with copper plating. In this graph, reference character W indicates an average gas pressure range in an usual operation region of an internal combustion engine.

In FIG. 12, the curves (1) to (5) are for the following samples (endless ring-like gasket):

(1): a comparative sample applied with only copper plating and coated with no lubricant (2): a sample applied with copper plate and coated with a metal lubricant (tradename: Molycoat) by baking (3): a sample applied with copper plating and coated on its upper surface with a heat-resisting lubricating oil (tradename: Honda Pure Oil Ultra U)

(4): a sample applied with copper plating and coated with an organic sealant (tradename: LR-51 by Japan Leakless) over the entire surface, followed by drying (5): a sample applied with copper plating and coated with the same lubricant as that described in (3) on a taperingly conical surface As seen from FIG. 12, for the comparative sample (1) applied with copper plating and coated with no lubricant, the gas leak amount becomes larger with an increasing pressure. The sample (2) coated with the metal lubricant, the gas leak amount is reduced more than that of the comparative sample (1).

For the sample (3) coated only on the upper surface (surface being in contact with the cylinder head) with a silicon oil, the gas leak amount is reduced.

For the sample (4) coated with an organic sealant, the gas leak amount is further improved. However, it is rapidly increased when the gas pressure exceeds a certain value.

For each of the samples (3) and (5) coated with a heat-resisting lubricating oil, the gas leak amount is reduced more than that of the comparative sample (1). In addition, with respect to the heat-resisting lubricating oil, the coating on the taperingly conical surface is more effective than that on the contact portion with the cylinder head. In the former, gas leaks do not occur very often.

The angle $\alpha$ of the taperingly conical surface may be in a range of from 30 to 60 degrees. In the tests shown in FIGS. 11 to 13, the angle $\alpha$ is set at 30 degrees.

Figure 13:
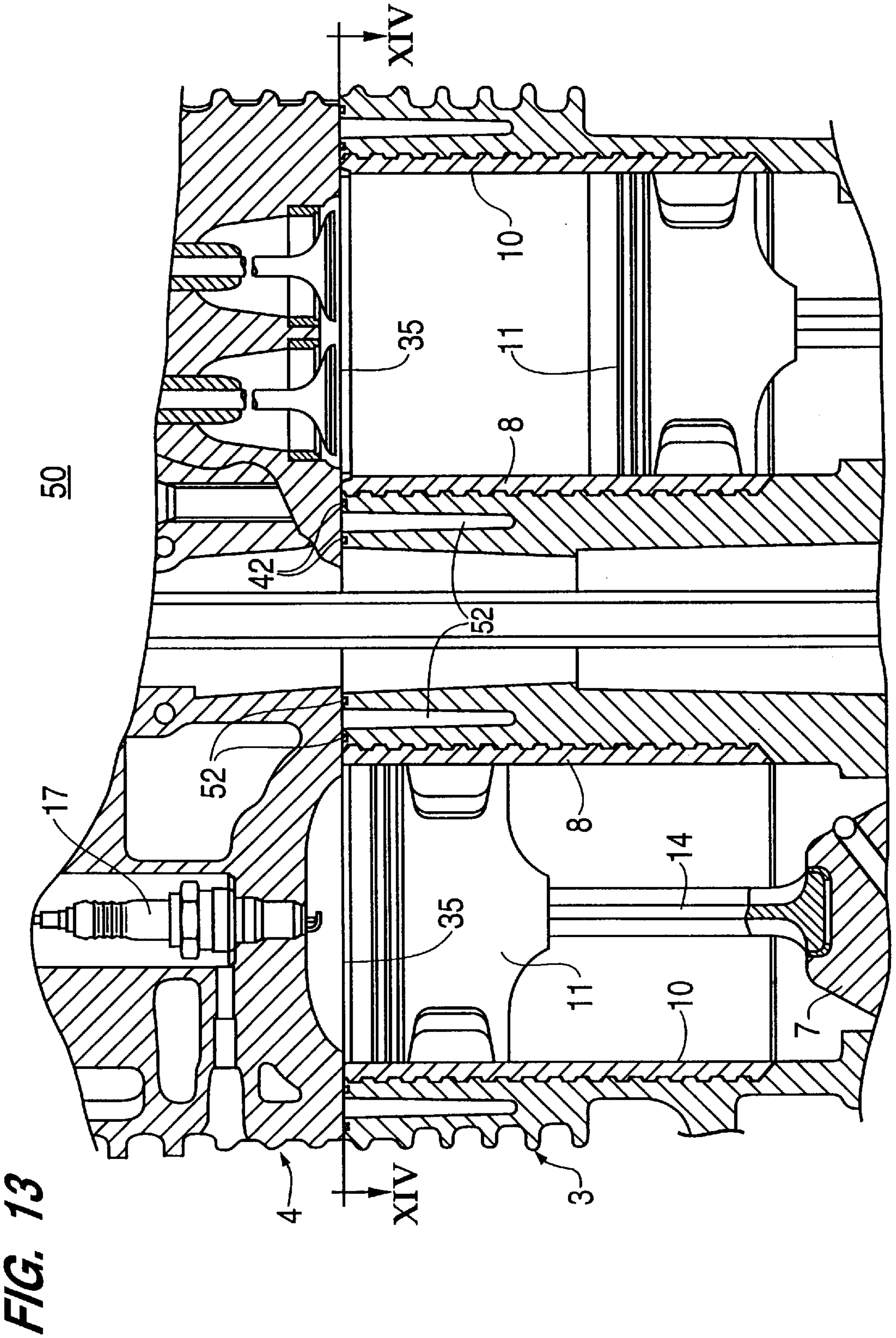
FIG. 13 is a vertical sectional side view showing a further embodiment of the present invention.
Figure 14:
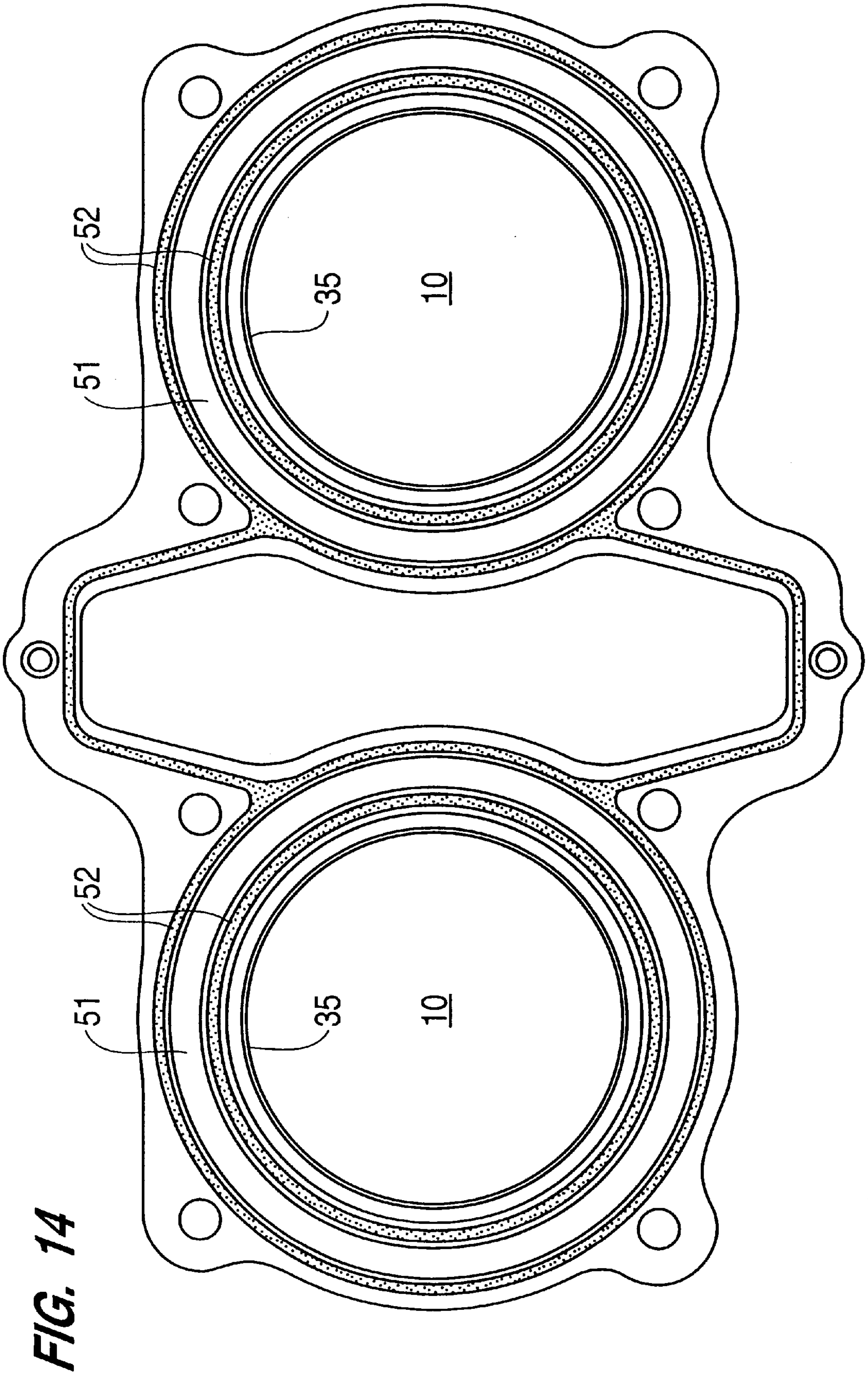
FIG. 14 is a view taken on line XIV—XIV of FIG. 13.
Figure 15:
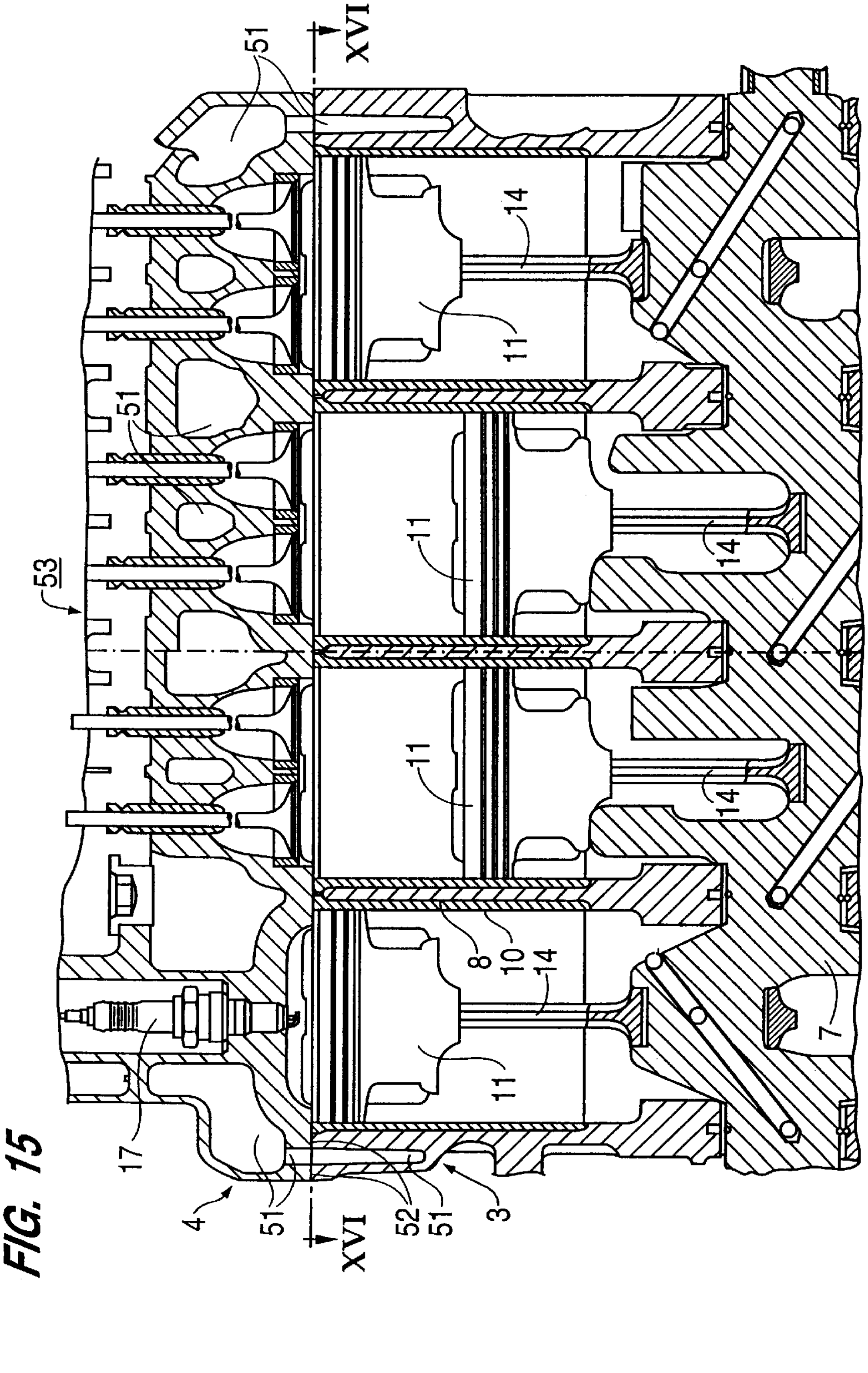
FIG. 15 is a vertical sectional view showing a further embodiment of the present invention.
Figure 16:
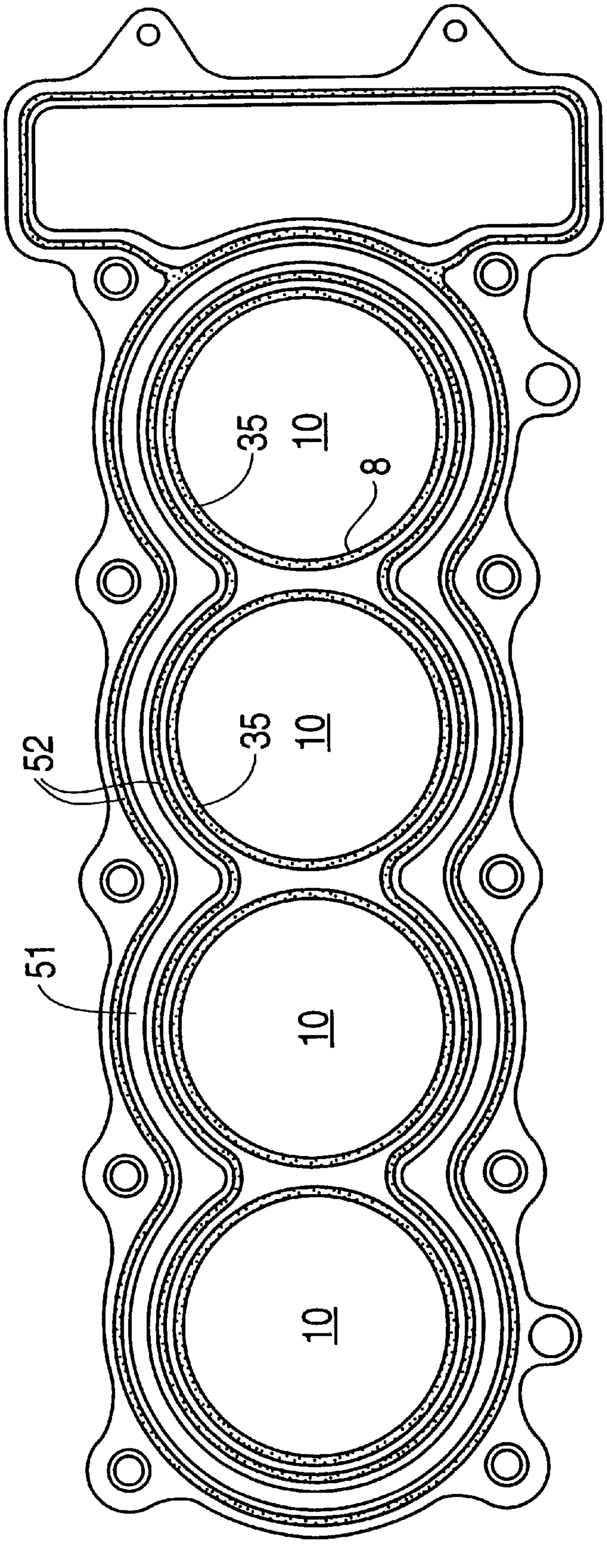
FIG. 16 is a view seen from arrow XVI—XVI of FIG. 15.

The present invention can be applied to the water-cooled overhead valve type 2-cylinder 4-cycle internal combustion engine 40 shown in FIGS. 13 and 14 as well as the water-cooled overhead valve type 4-cylinder 4-cycle internal combustion engine 53 shown in FIGS. 15 and 16. In this case, it is necessary to arrange a water seal gasket 52 so as to surround the circumference of a water jacket 51. However, since the water seal gasket 52 is separated from the endless ring-like gasket 35, the water seal gasket 52 made of a soft synthetic resin which is poor in heat resistance but rich in elasticity can be used to thereby easily secure a more complete sealability with respect to cooling water. Moreover, the present invention may be of course applied to both an air-cooled and water-cooled type 2 cycle internal combustion engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A sealing structure for a cylinder and a cylinder head in a reciprocating type internal combustion engine in which said cylinder and said cylinder head are sealed by drawing said cylinder and said cylinder head closer to each other by means of fastening and fixing means comprising:

a gasket interposed between said cylinder and said cylinder head within a cylinder bore of said cylinder;

said gasket being a ring-like shape and being clamped by said fastening and fixing means through said cylinder and said cylinder head;

said gasket includes an outer peripheral surface formed into a taperingly inclined surface so that said ring-like gasket receives a compressive force along a circumferential direction of said ring-like gasket;

either said cylinder or said cylinder head has an inclined surface capable of being brought in close contact with said taperingly inclined surface of said ring-like gasket; and wherein said ring-like gasket includes a generally planar, upper end surface, said generally planar, upper end surface being generally co-planar with an upper end surface of said cylinder and a lower end surface of said cylinder head when said cylinder and said cylinder head are drawn close to each other by said fastening and fixing means.

2. A sealing structure for a cylinder and a cylinder head in a reciprocating type internal combustion engine comprising:

a gasket interposed between said cylinder and said cylinder head, said cylinder and said cylinder head being removably connected to each other;

said gasket being formed in a ring-shape and being disposed at an edge portion of a cylinder bore of said cylinder on a side being brought into contact with said cylinder head;

the edge portion of said cylinder bore on the side being brought in contact with said cylinder head has a notched inclined surface having an inside diameter gradually enlarged from an inner peripheral surface of said cylinder bore to the contact surface between said cylinder bore and said cylinder head;

an outer peripheral portion of said ring-like gasket on a cylinder side has a taperingly inclined surface capable of being brought into close contact with the notched inclined surface of said cylinder bore; and wherein said gasket includes a generally planar end surface, said generally planar end surface being generally coplanar with an upper end surface of said cylinder when said cylinder and said cylinder head are connected to each other.

3. The sealing structure for a cylinder and a cylinder head in a reciprocating type internal combustion engine according to claim 1, wherein said generally planar, upper end surface of said ring-like gasket is located on a side opposed to said taperingly inclined surface; and said generally planar, upper end surface of said ring-like gasket can be brought into close contact with the lower end surface of said cylinder head or the upper end surface of said cylinder.

4. The sealing structure for a cylinder and a cylinder head in a reciprocating type internal combustion engine according to claim 2, wherein said planar end surface of said ring-like gasket is located on a side opposed to said taperingly inclined surface; and said planar end surface of said ring-like gasket can be brought in close contact with a lower end surface of said cylinder head or the upper end surface of said cylinder.

5. The sealing structure for a cylinder and a cylinder head in a reciprocating type internal combustion engine according to claim 1, wherein said engine is a multicylinder internal combustion engine.

6. The sealing structure for a cylinder and a cylinder head in a reciprocating type internal combustion engine according to claim 2, wherein said engine is a multicylinder internal combustion engine.

7. The sealing structure for a cylinder and a cylinder head in a reciprocating type internal combustion engine according to claim 3, wherein said engine is a multicylinder internal combustion engine.

8. The sealing structure for a cylinder and a cylinder head in a reciprocating type internal combustion engine according to claim 1, wherein a thin film made from a material softer relative to the material of said ring-like gasket is formed on a surface of said ring-like gasket.

9. The sealing structure for a cylinder and a cylinder head in a reciprocating type internal combustion engine according to claim 2, wherein a thin film made from a material softer relative to the material of said ring-like gasket is formed on a surface of said ring-like gasket.

10. The sealing structure for a cylinder and a cylinder head in a reciprocating type internal combustion engine according to claim 3, wherein a thin film made from a material softer relative to the material of said ring-like gasket is formed on a surface of said ring-like gasket.

11. The sealing structure for a cylinder and a cylinder head in a reciprocating type internal combustion engine according to claim 1, wherein a surface of said ring-like gasket is coated with a lubricant.

12. The sealing structure for a cylinder and a cylinder head in a reciprocating type internal combustion engine according to claim 2, wherein a surface of said ring-like gasket is coated with a lubricant.

13. The sealing structure for a cylinder and a cylinder head in a reciprocating type internal combustion engine according to claim 3, wherein a surface of said ring-like gasket is coated with a lubricant.

14. A sealing structure for a cylinder and a cylinder head in a reciprocating type internal combustion engine in which said cylinder and said cylinder head are sealed by drawing said cylinder and said cylinder head closer to each other comprising:

a ring-like gasket being interposed between said cylinder and said cylinder head within a cylinder bore of said cylinder;

an outer peripheral surface of said ring-like gasket being formed into a taperingly inclined surface so that said ring-like gasket receives a compressive force along a circumferential direction of said ring-like gasket;

at least one of said cylinder and said cylinder head includes an inclined surface brought into close contact with said taperingly inclined surface of said ring-like gasket by said compressive force; and wherein said ring-like gasket includes a generally planar, upper end surface, said generally planar, upper end surface being generally co-planar with an upper end surface of said cylinder and a lower end surface of said cylinder head when said cylinder head and cylinder are drawn close to each other.

15. The sealing structure for a cylinder and a cylinder head in a reciprocating type internal combustion engine according to claim 14, wherein said generally planar, upper end surface of said ring-like gasket is on a side opposed to said taperingly inclined surface; and said generally planar, upper end surface of said ring-like gasket is brought into close contact with at least one of the lower end surface of said cylinder head and the upper end surface of said cylinder by said compressive force.

16. A method for providing a sealing structure for a cylinder and a cylinder head in a reciprocating type internal combustion engine in which said cylinder and said cylinder head are sealed by drawing said cylinder and said cylinder head closer to each other comprising the following steps:

forming an outer peripheral surface of a ring-like gasket into a taperingly inclined surface so that said ring-like gasket receives a compressive force along a circumferential direction of said ring-like gasket;

interposing said ring-like gasket between said cylinder and said cylinder head within a cylinder bore of said cylinder;

forming at least one of said cylinder and said cylinder head to include an inclined surface brought into close contact with said taperingly inclined surface of said ring-like gasket by said compressive force;

clamping said gasket by said securing means through said cylinder and said cylinder head; and compressing a generally planar, upper end surface of said ring-like gasket during said clamping step to bring said generally planar, upper end surface into generally co-planar relationship with an upper end surface of said cylinder and a lower end surface of said cylinder head.

17. The method for providing the sealing structure for a cylinder and a cylinder head in a reciprocating type internal combustion engine according to claim 16, and further including the steps of forming said generally planar, upper end surface of said ring-like gasket on a side opposed to said taperingly inclined surface; and bringing said generally planar, upper end surface of said ring-like gasket into close contact with at least one of the lower end surface of said cylinder head and the upper end surface of said cylinder by said compressive force.

18. The method of assembling a sealing structure for a cylinder and a cylinder head in a reciprocating type internal combustion engine according to claim 16, wherein said cylinder head is assembled with said cylinder through said ring-like gasket by coating a surface of said ring-like gasket with a lubricant, interposing said ring-like gasket between said cylinder and said cylinder head, and forcibly fastening and fixing said ring-like gasket by means of said cylinder and said cylinder head.

19. The method for providing the sealing structure for a cylinder and a cylinder head in a reciprocating type internal combustion engine according to claim 16, wherein said engine is a multicylinder internal combustion engine.

20. The method for providing the sealing structure for a cylinder and a cylinder head in a reciprocating type internal combustion engine according to claim 16, wherein a thin film made from a material softer relative to the material of said ring-like gasket is formed on a surface of said ring-like gasket.

21. The sealing structure for a cylinder and a cylinder head in an internal combustion engine according to claim 2, wherein said planar end surface is an upper surface and is generally coplanar with a lower end surface of said cylinder head when said cylinder and said cylinder head are connected to each other.

* * * * *